United States Patent [19]

Sutton et al.

[11] Patent Number: 4,475,025
[45] Date of Patent: Oct. 2, 1984

[54] CYCLE TIMER CIRCUIT FOR ELECTRICAL DISCHARGE MACHINING

[75] Inventors: William T. Sutton, Charlotte; Robert C. Brown, Mooresville, both of N.C.

[73] Assignee: Colt Industries Operating Corp., New York, N.Y.

[21] Appl. No.: 420,327

[22] Filed: Sep. 20, 1982

[51] Int. Cl.³ .............................. B23P 1/08; B23P 1/12
[52] U.S. Cl. ................................ 219/69 C; 219/69 G
[58] Field of Search ................. 219/69 C, 69 G, 69 P, 219/69 M

[56] References Cited

U.S. PATENT DOCUMENTS

| | | | |
|---|---|---|---|
| 3,370,147 | 2/1968 | Matulaitis | 219/69 G |
| 3,381,107 | 4/1968 | Poerschke | 219/69 G |
| 3,435,177 | 3/1969 | Shaffer | 219/69 G |
| 3,492,593 | 1/1970 | Ullmann et al. | 219/69 P |
| 3,539,755 | 11/1970 | Inoue | 219/69 P |
| 3,649,802 | 3/1972 | Sennowitz | 219/69 C |
| 3,755,645 | 8/1973 | Kauffman | 219/69 G |
| 3,767,886 | 10/1973 | Sennowitz | 219/69 C |
| 3,789,182 | 1/1974 | Verner | 219/69 C |
| 3,825,714 | 7/1974 | Marendaz | 219/69 C |
| 4,185,184 | 1/1980 | Pfau | 219/69 C |
| 4,263,494 | 4/1981 | Martin | 219/69 C |
| 4,319,114 | 3/1982 | Bell, Jr. et al. | 219/69 P |

Primary Examiner—Roy N. Envall, Jr.
Assistant Examiner—Geoffrey S. Evans
Attorney, Agent, or Firm—Harry R. Dumont

[57] ABSTRACT

A cycle timer circuit for electrical discharge machining. Operation of the electrode is controlled by a pair of solid state timers working in timed relationship, one with the other, to provide an up time duration of greater magnitude than the down time duration.

5 Claims, 3 Drawing Figures

CYCLE TIMER CIRCUIT FOR ELECTRICAL DISCHARGE MACHINING

TECHNICAL FIELD

This invention relates to a cycle timer type circuit for use with an electrical discharge machining power supply and machine tool. The controlled operation provides predetermined travel through a portion of the distance back down under full servo control with full sensing capability so that there is no possibility of breaking the electrode against the workpiece.

BACKGROUND ART

The present invention relates to a circuit for electrical discharge machining, sometimes hereinafter refered to as "EDM". The circuit is designed for use with cavity sinker type EDM equipment in which an electrode is mounted on a ram and controlled in its up and down movements during cutting. There is necessarily provided a control for initiating the cycle time and another for controlling backup of the electrode and ram after the cutting is concluded. One of the basic elements of this invention is the provision of a rapid backup and approach servo feed circuit that operates to reduce down time between cutting cycles. A circuit and arrangement having a like purpose is shown and described in W. B. Shaffer U.S. Pat. No. 3,435,177 issued on Mar. 25, 1969 for "Servo Control Circuit for Electrical Discharge Machining Apparatus" which patent is of common ownership herewith.

In many cycle timer circuits, microswitches are used which determine the change of direction and speed of the electrode and the ram carrying it. This results in an unnecessarily complicated system and one subject to wear and to malfunction. The present circuit and system are controlled by a pair of independently operating timers so that the cycle timer is reliably controlled without any deviation or variation in its predictability.

DISCLOSURE OF THE INVENTION

The present invention is particularly adapted for cavity sinker EDM equipment in which the electrode and its movements toward and away from the electrode are under the control of an electrical or electrohydraulic servo feed system that is controlled by a gap parameter, such as gap voltage or gap current and used to provide relative movement to maintain an optimum gap spacing between the electrode and the workpiece as workpiece material is removed. A dielectric coolant is continuously circulated, filtered and recirculated through the gap during machining operations. For most uniform and predictable results, a power supply of the independent pulse generator type is used to provide machining power pulses of precisely controllable frequency and on-off times to initiate the electrical gap discharges needed for material removal.

The present invention provides a dual timer system in which a first timer controls the rapid travel required during electrode backup and initial electrode downfeed. A second timer is used to control direction of the electrode movement either up or down while a conjoint control means is included for presetting a timed relationship between the first named and second timers so that for the necessary period of time there will be a return of the servo feed and electrode to the control of the normal servo feed signal to avoid crashing into the workpiece on final approach.

BEST MODE FOR CARRYING OUT THE INVENTION

Figure 1:
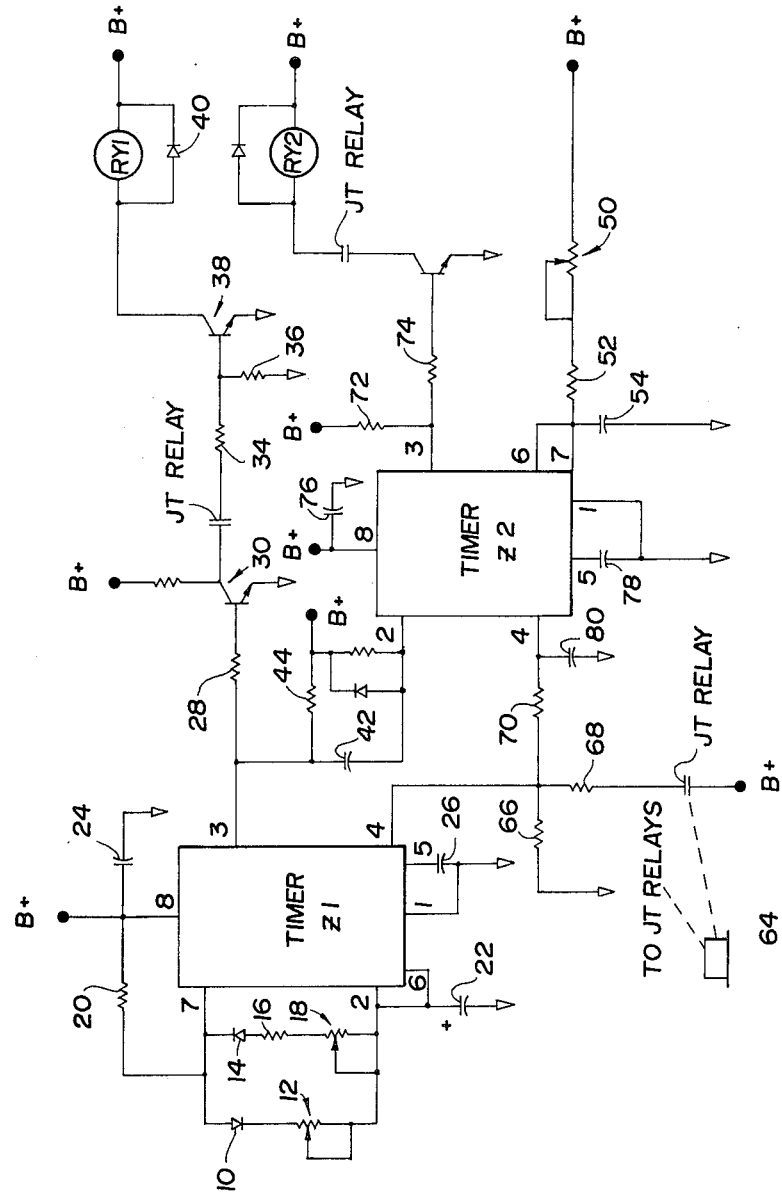
FIG. 1 is a combined block diagramatic and schematic showing of the invention.

FIG. 1 shows timers Z1 and Z2 which control relays RY1 and relay RY2, respectively. The timers are free-running multi-vibrators with independent control of high and low periods. The control for timer Z1 is exercised through diode gating and through diode 10, potentiometer 12, through diode 14, series resistor 16 and potentiometer 18. The timed high for the pulse from timer Z1 is controlled by the charge path through the resistor 20 connected back to a B+ supply voltage and through the potentiometer 12. The potentiometer 12 is embodied as a front panel potentiometer that makes the cutting time adjustable by the operator. The greater the resistance preset in the potentiometer 12, the longer the cutting time. Thus the network for the time high is controlled by the potentiometer 12 and resistor 20 taken in combination with the capacitor 22 connected to pins 2 and 6 of the timer Z1.

The discharge time controlling the timer Z1 will be the pulse low time. The pulse output on pin 3 of the timer Z1 will be controlled by the series combination of resistor 16 and potentiometer 18 with the capacitor 22. Thus, in the operation of the control networks for the timer Z1, the capacitor 22 is charged through the diode 10 and potentiometer 12 and it is discharged back through the potentiometer 18 resistor, the series resistor 16 and the diode 14. Additional capacitors 24 and 26 are connected between the several pins of timer Z1 and ground as shown.

The output from the pin 3 of the timer Z1 is fed through a series resistor 28 to the base of an NPN transistor 30 which operates as a current amplifier. The output signal is inverted. Resistors 34 and 36 are connected in circuit as shown with an additional transistor stage including a transistor 38 which drives the relay RY1. RY1 is also connected to a B+ voltage source and shunted by a diode 40 as shown.

Figure 3:
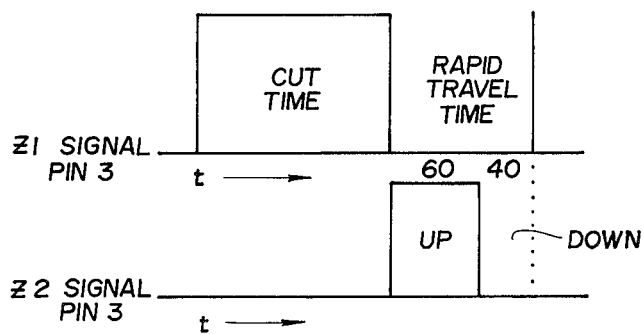
FIG. 3 is a graph with time on the abscissa showing the relationship between the two timer outputs and the related controls for the electrode movement.

The output of pin 3 of the timer Z1 is fed through a RC differentiating network including capacitor 42 and 44 to the pin 2 of the timer Z2. A spike input pulse is provided on the pin 2 of the timer Z2 which corresponds to the negative edge of the pulse on the pin 3 of the timer Z1. This is important because the trigger pulse must be a very short negative spike on pin 2. The timer Z2 operates essentially as a one-shot multivibrator. The timed high on the timer Z2 is controlled by a charge path through potentiometer 50, series resistor 52 and a capacitor 54. The potentiometer 50 related to the timer Z2 and the potentiometer 18 associated with the timer Z1 are mechanically embodied as a dual potentiometer so that it is possible to maintain the desired 60-40 relationship over the whole range with a single mechanical adjustment. Independently of what values are dialed in on the ganged potentiometers there will always be a 60-40 relationship. This timed relationship is illustrated in FIG. 3. In other words, for the rapid travel time corresponding to a pulse low time from the pin 3 of the timer Z1, there will be provided from the timer Z2 a pulse that is high corresponding to 60% of that time. It will then go low and remain low for 40% of the time at pin 3 on timer Z1.

The manner in which this control is exercised will be further explained hereinafter and in connection with FIG. 2 and the relay control circuit.

Figure 2:
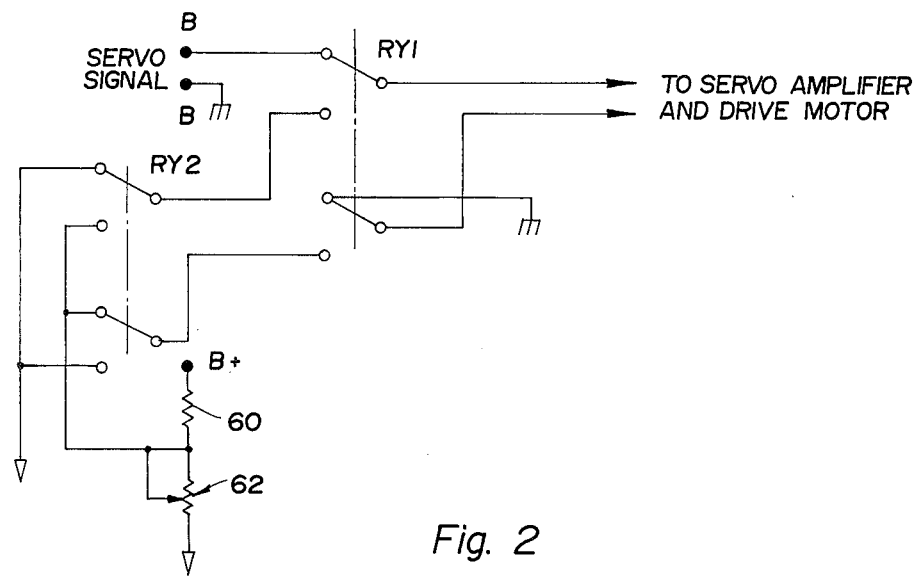
FIG. 2 is a schematic showing the relay control portion of the circuit maintaining relationship of up and down signal.

The circuit of FIG. 2 essentially operates and controls the servo signals with the input servo signal coming at terminals B—B the upper left hand side of the drawing and being representative of gap average or gap peak voltage or some other adjusted electrical parameter of the gap. Under normal operating conditions, the servo signal will pass through the upper movable contact of the RYI in the manner shown and it will be passed directly to the servo amplifier and then to the drive motor to control the electrode movement in a manner well known in the EDM art. It is this motor of course which controls the ram up and down signal in the typical cavity sinking EDM equipment. Thus, with the relay RYI de-energized the signal goes straight through. When the relay 1 is energized, the input to the servo amplifier is transfered through the lower associated circuitry which contains the relay RY2 contacts, a resistor 60 and a potentiometer 62.

In this manner, when relay RYI is energized, a rapid travel mode results the direction of which is determined by the state of the relay RY2. With the relay RY2 de-energized, the voltage is of a negative polarity. This is accomplished through taking a B+ voltage supply and floating it. If the relay RY2 is de-energized a negative voltage is provided to the servo amplifier and when it is energized it is flipped over and a positive voltage is provided to the servo amplifier. It will be understood that a negative voltage provides a down signal. The relay RY2 changes state according to the 60-40 timer relationship as already shown and explained with an up voltage for 60% and down voltage for 40%. Thus travel back down is approximately 20% conducted under full servo control with full sensing capability. In this way it is insured that the electrode will not strike the workpiece and cause breakage or damage.

It will be understood that a cycle timer control is normally provided on a front panel on the machine and includes a push button type switch such as switch 64 which is pressed after the cycle start to initiate the cycle timing. A pair of relays JT are included as shown with a contact normally open and connected through a resistor network to the pin 4 of each of the two timers Z1 and Z2. The resistors are identified as resistors 66, 68 and 70. It will be understood that the pin 4 on both the timers is a reset pin so that any time the cycle timer mode has not been selected, both timers are in the reset mode in case they are not performing any operation. During this time period, normal cutting operation takes place through relay 1 as shown in FIG. 2. When the timer relay is closed pin 4 in each is pulled up to a plus voltage which takes them out of the reset mode and allows them to function as in the manner already described. The network shown in FIG. 1 thus does not become operative until the cycle timer mode has been actually selected by the operator. Additional networks associated with the timer Z2 include a B+ voltage, source resistors 72 and 74 as shown and capacitors 76 and 78 connected as shown.

In connection with the two timers Z1 and Z2, the pins 4 are reset pins. In timer Z1, pins 2 and 6 have connected across them a time constant control input. In timer Z2, pin 2 receives a triggered input. In Z2, pins 6 and 7 also have connected to them a time constant control input.

It will thus be seen that the circuit according to the present invention insures an up and down time ratio of 60 and 40 which is preset because of the magnitude of the ganged potentiometers used to control the timing for timer Z1 low and the timing for timer Z2 high. In other words, for a given period of rapid travel, up will be for 60% of the time and down will be for 40% of the time. This will always guarantee that the machine will have returned to servo control safely prior to the time the ram approaches contact with the workpiece. This circuit arrangement is one which is substantially improved and requires no involved switching networks or microswitches for cycle timer operation. The entire operation is precisely preset and reliably controlled by the pair of solid state timers.

We claim:

1. A cycle timer circuit for electrical discharge machining apparatus including an electrically controlled drive means for providing for relative travel between an electrode and a workpiece during cutting cycles, comprising:
   a first timer means of the free running multivibrator type for presetting rapid travel time of the drive means between cutting cycles;
   a second timer means of the free running multivibrator type for presetting proportional up and down time direction of electrode travel during said rapid travel times; and
   a conjoint control means for selectively setting a timed relationship between said first and second timer means whereby the up time is of greater magnitude than the down time;
   a pair of relay means each operatively connected to the output of one of said timer means for providing an appropriate signal to said drive means; one of the relay means operable to change the polarity of signal provided to said drive means for controlling the direction of movement of the electrode.

2. The combination as set forth in claim 1 wherein said timers include independent control means for their respective high and low times.

3. The combination as set forth in claim 2 wherein said means for independent control comprise external RC time constant circuits.

4. The combination as set forth in claim 1 wherein said free running multivibrators included are of the solid state type.

5. The combination as set forth in claim 1 wherein said conjoint control means comprises a pair of potentiometers ganged for joint operation.

* * * * *